United States Patent [19]

Sakaegi

[11] Patent Number: 5,095,391
[45] Date of Patent: Mar. 10, 1992

[54] RECORDING APPARATUS WITH RECORDING SECTION POWER SUPPLY CONTROL

[75] Inventor: Yuji Sakaegi, Kanagawa, Japan

[73] Assignee: Canon, Kabushiki Kaisha, Tokyo, Japan

[21] Appl. No.: 547,926

[22] Filed: Jul. 3, 1990

Related U.S. Application Data

[63] Continuation of Ser. No. 258,692, Oct. 17, 1988, abandoned.

[30] Foreign Application Priority Data

Oct. 26, 1987 [JP] Japan .................. 62-271189

[51] Int. Cl.⁵ .......................................... H04N 5/781
[52] U.S. Cl. ..................... 360/33.1; 358/342; 369/50
[58] Field of Search ............... 358/310, 335, 342, 906, 358/909; 360/33.1, 35.1; 365/226, 227; 369/48, 49, 50

[56] References Cited

U.S. PATENT DOCUMENTS

| | | | |
|---|---|---|---|
| 4,531,164 | 7/1985 | Maeda et al. | 358/906 |
| 4,760,452 | 7/1988 | Kaneko et al. | 358/909 |
| 4,802,020 | 1/1989 | Miyake et al. | 358/909 |
| 4,825,302 | 4/1989 | Tezuka et al. | 358/335 |
| 4,858,031 | 8/1989 | Fukuta | 358/342 |

Primary Examiner—Donald McElheny, Jr.
Attorney, Agent, or Firm—Robin, Blecker, Daley & Driscoll

[57] ABSTRACT

A recording apparatus using a disc-shaped recording medium provided with a marker member on the recording medium for detection of the rotation phase thereof includes a phase detector for detecting the marker member while the recording medium is rotating; a delay circuit for delaying the output of the phase detector for a given period of time; a recording circuit for recording signals of the disc-shaped recording medium by means of a magnetic head; and a control circuit which is arranged to supply a current to the recording circuit at the timing of the output of the phase detector and to cause the recording circuit to perform recording at the timing of the output of the delay circuit.

44 Claims, 7 Drawing Sheets

RECORDING APPARATUS WITH RECORDING SECTION POWER SUPPLY CONTROL

This application is a continuation of application Ser. No. 258,692, filed Oct. 17, 1988, now abandoned.

BACKGROUND OF THE INVENTION

1. Field of the Invention

This invention relates to a recording apparatus of the kind using a rotary recording medium.

2. Description of the Related Art

The recording apparatuses performing recording on rotary recording media have been arranged in varied manners according to the kind of the recording media to be used and the recording method employed.

Figure 1:
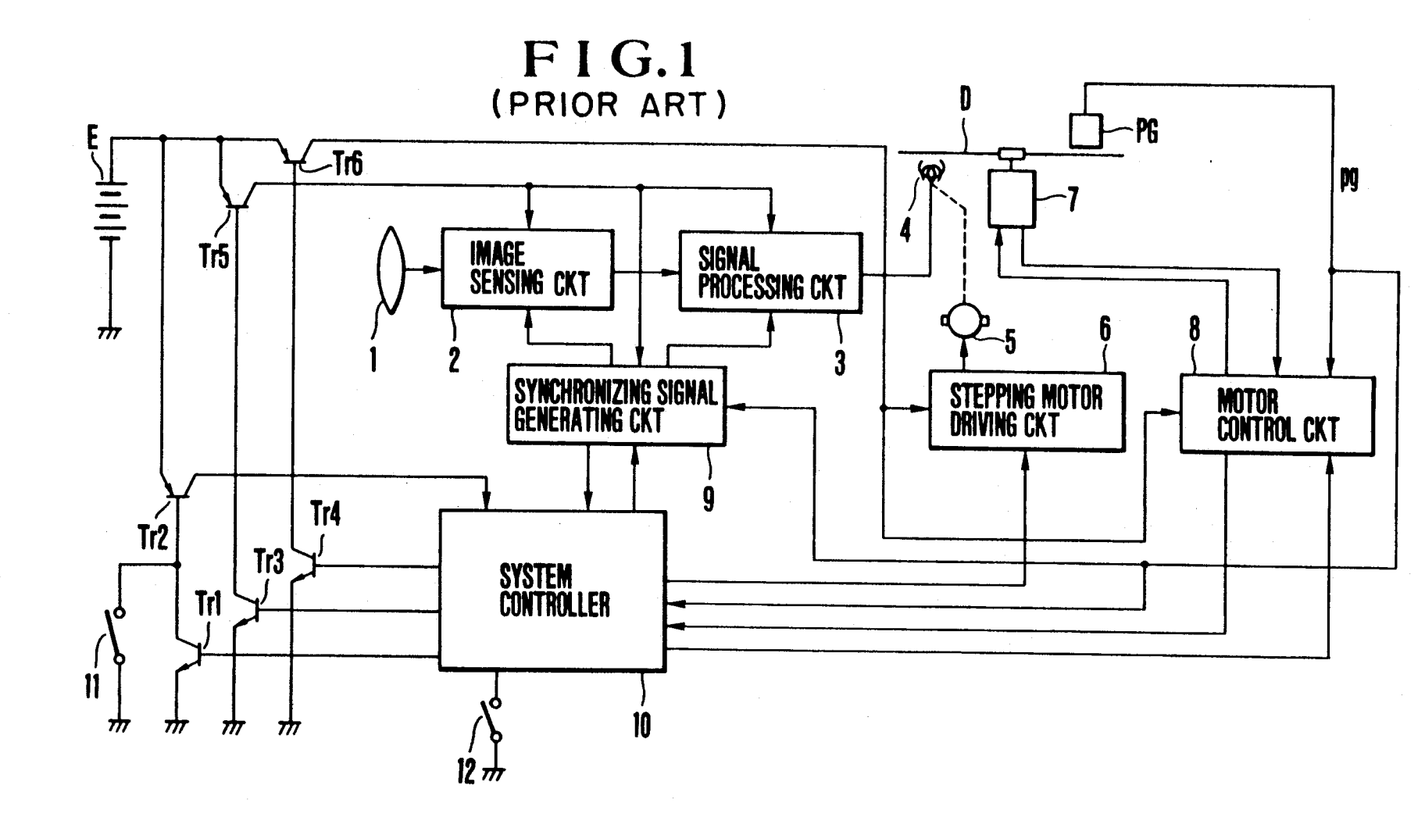
FIG. 1 is a block diagram showing a control circuit system arranged in the conventional recording apparatus.

These known recording apparatuses include, an electronic still video camera. Unlike the conventional silver halide type camera, the still video camera records a still image on a rotating magnetic disc and is arranged, for example, as shown in FIG. 1 of the accompanying drawings. FIG. 1 is a block diagram showing the operation control system of the still video camera of the above stated kind. The illustration includes an optical system 1 including a photo taking lens; an image sensing circuit 2 which is arranged to photo-electric convert information on an image formed by the optical system 1 and to produce a video signal, the circuit 2 being composed of a CCD or a camera tube, etc.; a signal processing circuit 3 which is arranged to perform a signal processing operation in a prescribed manner on the video signal produced from the image sensing circuit 2 and thus to convert it into a signal form suited for recording on a magnetic disc D; a magnetic head 4; a stepping motor 5 which is arranged to move the magnetic head 4 in the radial direction of the magnetic disc D; a motor driving circuit 6 which is arranged to drive and control the head moving stepping motor 5; the magnetic disc D; a motor 7 which is arranged to rotate the magnetic disc D; a motor control circuit 8 for controlling the motor 7; and a PG detector PG (or a PG coil) which is arranged to detect the rotation phase of the magnetic disc D through a marker member (PG pin), which is disposed in a given position on the magnetic disc D. A synchronizing signal generating circuit 9 is arranged to receive the output signal pg of the PG detector PG and to generate and supply a synchronizing signal to the image sensing circuit 2 and to the signal processing circuit 3 in accordance with the timing of the signal pg. A system controller 10 is arranged to perform control over all the operating circuit blocks and is composed of a CPU. A switch 11 is arranged to close in response to the first step of stroke of a pushing operation performed on a release switch which is not shown but is arranged to give an instruction for a recording action. A switch 12 is arranged to close in response to the second step of stroke of the release switch. Transistors Tr1 to Tr6 are provided for operation control. A reference symbol E denotes a power source battery.

Figure 2:
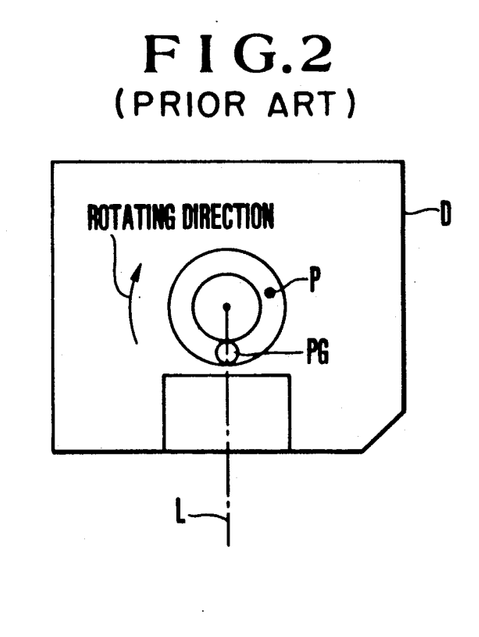
FIG. 2 shows the PG detector mounting position of the conventional apparatus.

With the apparatus arranged in the above stated manner, a recording operation is performed as follows: The transistor Tr2 becomes conductive when the release switch which is not shown is pushed to the first stroke position thereof. This causes the battery E to effect a power supply to the system controller 10. The system controller 10 then applies a high level signal to the base of the transistor Tr1 to make it conductive. By this, the transistor Tr2 is kept in an on-state. At the same time, the transistor Tr4 is turned on with the base thereof caused to be at a high level. The transistor Tr4 in turn brings the transistor Tr6 into a conductive state. As a result, a power supply is effected to the stepping motor driving circuit 6 and the motor driving system of the motor control circuit 8 respectively. Further, the system controller 10 controls and causes the motor 7 to steadily rotate through the motor control circuit 8. In this instance, the PG detector PG (PG coil) which is disposed on the side of the recording apparatus detects a PG pin p which is provided for phase detection and is disposed in a given position on the disc D as shown in FIG. 2. The PG detector PG (PG coil) then produces one pulse signal as a signal pg every time the disc D makes one turn by detecting the PG pin p. Meanwhile, an FG signal generator which is not shown is arranged to produce a plurality of pulse signals per turn of the disc D. Control for the steady rotation and phase of the disc D are accomplished on the basis of these signals.

Referring to FIG. 2, the PG pin p which is disposed on the side of the disc D is arranged to permit magnetic detection of the rotation phase of the disc D by inducing the lines of magnetic force of a magnet which is disposed on the side of a spindle (not shown). The PG detector PG which is arranged to generate the pulse signal pg by detecting the PG pin p includes a detection coil (PG coil). The detection coil is disposed at a given distance (4.5 mm in the case of a still video camera) away from the rotation shaft of the disc (hereinafter referred to as a spindle) and on a straight line (hereinafter referred to as an in-line) L which represents the locus of the radial movement of the head 4 taking place as the disc is driven. The rotation phase of the disc is thus detectable.

When the release switch is further pushed to the second step position thereof, the system controller 10 turns the transistor Tr5 on through the transistor Tr3. As a result, the power supply is effected to the image sensing circuit 2 which includes a solid-state image sensor such as a CCD, the synchronizing signal generating circuit 9 and the signal processing circuit 3. Then, timing signals of varied kinds necessary for forming a video signal to be recorded on the disc D, such as a color synchronizing signal C-SYNC, a vertical synchronizing signal V-SYNC, a color blanking signal C-BLANK, etc., are generated. After a clearing action on the CCD, an exposure is effected by opening and closing a shutter to accomplish a photo taking operation.

With the power supply effected to the image sensing circuit 2, the synchronizing signal generating circuit 9 and the signal processing circuit 3, actual recording on the disc D is performed after the lapse of a given length of time required before these circuits become stably operable. In other words, after the lapse or a given period of n sec or, for example, 7H±2H (H: a horizontal scanning period), the vertical synchronizing signal is recorded on the disc D. Following this, video signals are recorded. The signal recording position on the disc is determined in accordance with a common format to ensure the interchangeability of apparatuses.

In accordance with the above stated arrangement of the apparatus, however, electric energy is wastefully consumed before actual recording on the disc, because: After the power supply is effected to an image sensing system including the image sensing circuit 2, the signal processing circuit 3 and the synchronizing signal generating circuit 9, all these circuits become operative. The power supply to the signal processing circuit 3 is not required until reading image information from the image sensor such as CCD or the like after completion of an exposure. However, in the case of a circuit of an analog system, it is generally necessary to switch the power supply on well in advance of the use of it as the circuit operation is often unstable immediately after the power supply is switched on. Assuming that the power supply is switched on at the timing of a PG pulse signal, at least about one field period (16.7 m sec) has been necessary before the stabilization of the circuit.

Therefore, an attempt to start recording at a recording start position on the disc after the lapse of a given period (7H±2H) from a point of time at which the PG pulse signal is detected would result in an inadequate record as the circuit has not been stabilized as yet, particularly in the case of an analog system circuit which has a long rise time. It is thus impossible to immediately begin to record from the recording start point which comes after the lapse of the period of 7H with the release button pushed to the second step position of its stroke. In view of this, therefore, it is necessary to wait for another field period and to begin recording on the disc after the lapse of another period of 7H following a PG pulse signal obtained after one turn of the disc.

In other words, the apparatus necessitates a long waiting period of time before actual recording after the power supply is effected to each circuit. This not only wastes the electric energy but also hinders photographing at a higher speed and is detrimental particularly to a high speed continuous photographing operation. The electric energy consumption and the hindrance to a higher speed has presented a serious problem for a still video camera or a like apparatus using a battery.

SUMMARY OF THE INVENTION

This invention is directed to the solution of the above stated problem of the prior art. It is therefore a first object of the invention to provide a recording apparatus which is capable of speedily recording a picked-up image information on a recording medium.

It is a second object of the invention to provide a recording apparatus which is arranged to reduce electric energy consumption.

It is a third object of the invention to provide a recording apparatus which permits an increase in recording speed as well as reduction in electric energy consumption without any change in the conventional format of recording on the recording medium.

To attain these objects, a recording apparatus arranged as a preferred embodiment of the invention to use a rotary recording medium which is provided with a marker member for detecting the rotation phase thereof comprises: rotatory driving means for rotating the recording medium; phase detecting means for detecting the marker member from the recording medium; delay means for delaying an output of the phase detecting means for a given period of time; recording means for recording on the recording medium; and control means for controlling a power supply to the recording means in synchronism with the timing of the output of the phase detecting means and for controlling a recording action in synchronism with the timing of an output of the delay means.

These components enable the embodiment to detect a PG pulse signal at an advanced timing which is earlier by a desired degree than a timing at which the PG pulse signal is detected by the conventional apparatus. Therefore, the PG pulse signal can be detected earlier by a minimum period of time required for the stabilization of a circuit which has slow rise time. The waiting time before recording thus can be minimized by effecting a power supply to the above stated circuits at this timing without holding a recording action in check for a period of time during which the disc makes one turn.

The embodiment forms a record on the recording medium in the same state or format as a record obtainable by the conventional apparatus. Therefore, the embodiment has the interchangeability with the conventional apparatus. Further, the degree of delay always can be set at a minimum value according to the circuit arrangement of the apparatus. Therefore, unlike the conventional recording apparatus, the electric energy can be prevented from being wasted by effecting a power supply to each circuit while the recording is kept waiting until a PG pulse signal is obtained after one turn of the disc. The electric energy consumption thus can be minimized.

Other objects and features of the invention will become apparent from the following detailed description taken in conjunction with the accompanying drawings.

DETAILED DESCRIPTION OF THE PREFERRED EMBODIMENTS

Figure 3:
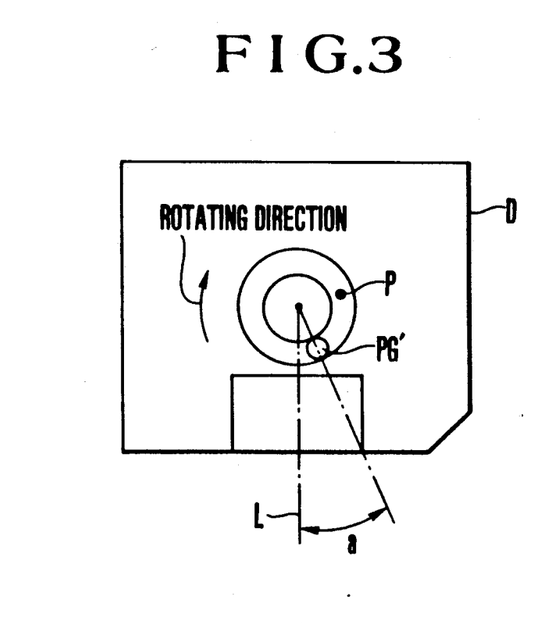
FIG. 3 shows the mounting position of a PG detector arranged according to this invention.

The following description of embodiments of this invention shows the details of the invented recording apparatus with reference to the accompanying drawings: FIG. 3 shows the mounting position of the PG detector PG' (PG coil) of the invented recording apparatus in relation to a disc D. As shown, the PG coil is mounted in a position which deviates as much as a given degree "a" of rotation angle from the position of the PG coil of the conventional apparatus described in the foregoing on the upstream side of the latter in the rotating direction of the disc D. With the PG coil mounted in this manner, the invented apparatus detects the PG pin p earlier than the conventional apparatus by a period of time corresponding to the rotation angle "a" when the disc D rotates. This enables the PG coil of the invented apparatus to produce a PG signal pg' at an advanced phase.

In the case of the conventional apparatus shown in FIGS. 1 and 2, a power supply is effected to each of the circuits concerned when the PG signal is detected; and then, if recording is allowed to begin immediately after the lapse of the period of 7H, the recording would be inadequately performed as the circuit of slow rise time, particularly an analog system circuit, has not been sufficiently stabilized by then. This has necessitated the conventional apparatus to perform recording after the lapse of a period of time corresponding to one turn of the disc after next detection of the PG pin. This has caused a longer recording time and a greater loss of electric energy.

To solve this problem, the arrangement according to this invention enables the circuit of slow rise time to be sufficiently stabilized before a start of recording at the position of the PG pin on the disc. For this purpose, a current is supplied to the circuit of slow rise time by detecting the PG pin earlier than the conventional arrangement. The recording start timing is thus allowed to delay as much as the time by which the PG pin is detected earlier, so that the actual recording start timing can be kept in conformity with the format of the conventional apparatus.

The position of the PG coil, that is, the rotation angle "a" is set to give a minimum period of time necessary for sufficient stabilization of an analog system circuit of slow rise time or the like after the lapse of a period of 7H±2H from the position of the PG pin with the disc allowed to rotate at a normal steady speed (3600 r.p.m.). In other words, the rotation angle "a" is set at a value between 3H and 4H (H: horizontal scanning period).

Figure 4:
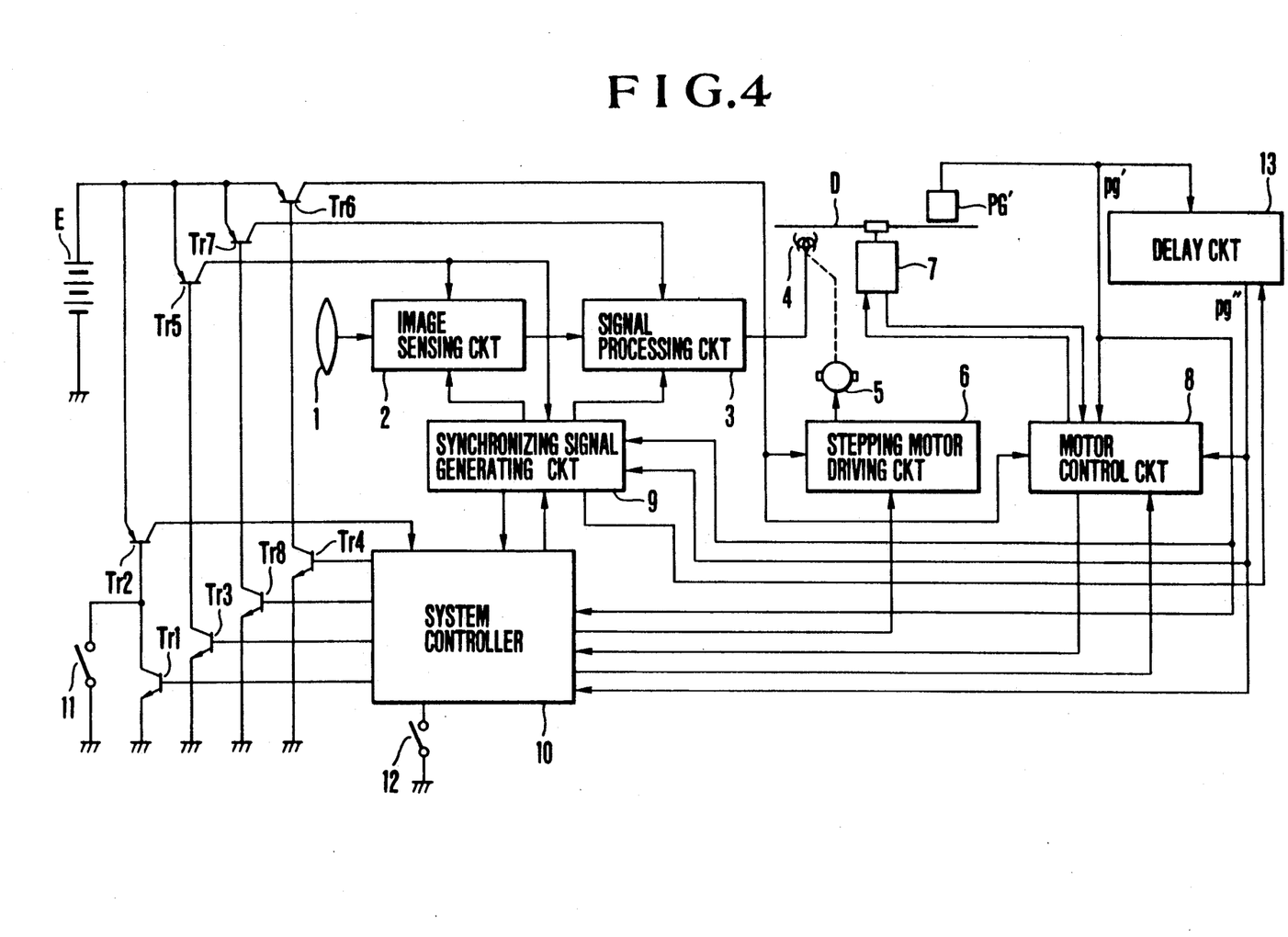
FIG. 4 is a block diagram showing the control circuit system of a first embodiment of this invention.

FIG. 4 shows in a block diagram a recording apparatus arranged as a first embodiment of the invention. The component parts which are the same as those of the conventional apparatus shown in FIG. 1 are indicated by the same reference numerals and the details of them are omitted from description. A feature of this embodiment resides in the provision of a delay circuit 13 on the output side of the PG detector PG'. The delay circuit 13 is arranged to delay a PG pulse signal pg' as much as a period of time corresponding to the degree of phasic advance relative to the conventional apparatus of FIGS. 1 and 2, because the PG detector PG' is mounted in a position differing from that of the conventional apparatus as much as the rotation angle "a" on the upstream side of the latter in the rotating direction of the disc. The delay circuit 13 thus delays the inputs of the motor control circuit 8, the synchronizing signal generating circuit 9 and the system controller 10. By this, a PG pulse signal pg" which is of the same timing as a PG pulse signal of the conventional apparatus is supplied to the signal processing system.

While the PG pin is detected earlier than the conventional apparatus by a degree corresponding to the difference in position of the PG coil to permit earlier power supply, the embodiment is arranged to have the absolute recording position on the disc unchanged from the conventional apparatus for interchangeability.

The PG pulse signal pg' produced from the PG coil PG' which is in the shifted position and a PG pulse signal pg" which is obtained by delaying the PG pulse signal pg' to a degree corresponding to the shifted degree of the position of the PG coil PG' are respectively supplied to the system controller 10.

Figures 5A, 5B, 5C, 5D, 5E:
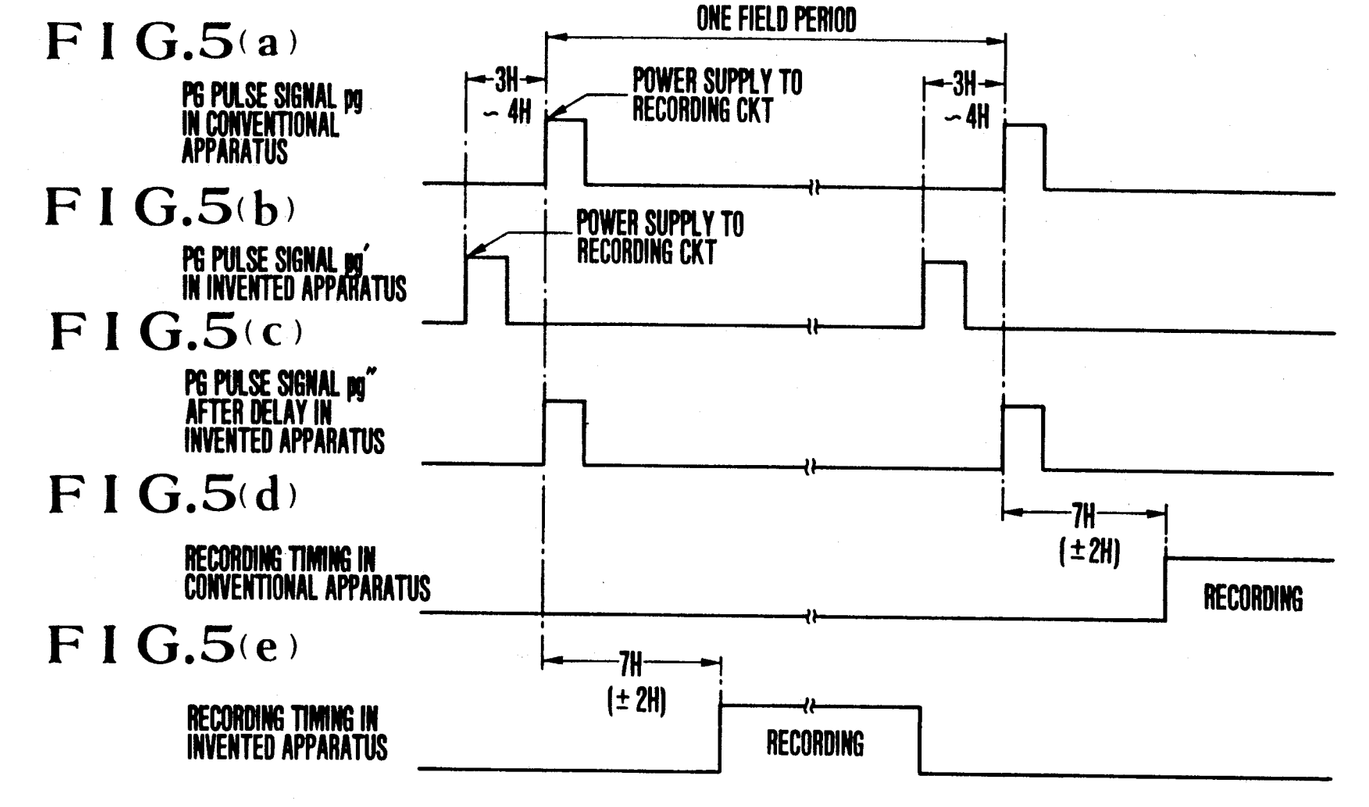
FIGS. 5(a) to 5(e) compare in a wave form chart the PG pin detection timing of this invention with that of the conventional apparatus.

The phasic relation between the PG pin detection signals of the conventional and the invented apparatuses is as shown in FIGS. 5(a) to 5(e), of which: FIG. 5(a) shows the detection pulse signal pg produced from the PG coil of the conventional apparatus. FIG. 5(b) shows the detection pulse signal pg' produced from the PG coil of the invented apparatus. FIG. 5(c) shows the PG pulse signal pg" obtained by delaying the detection pulse of the PG coil in such a way as to have the same timing as the conventional apparatus. FIG. 5(d) shows the recording start timing of the conventional apparatus. FIG. 5(e) shows the recording start timing of the invented apparatus.

In the case of the conventional apparatus, it is impossible to start a recording action immediately after the lapse of the period of 7H because of the long rise time of the circuit. Therefore, recording must be arranged to start after the lapse of another period of 7H from a point of time at which a PG pulse is obtained next time as mentioned in the foregoing.

Whereas, in accordance with this invention, the power supply is effected to the circuit in response to the PG pulse signal pg' the phase of which is in advance of that of the PG pulse signal of the conventional PG pulse signal to a degree corresponding to the PG coil shifted degree (the rotation angle "a"). Then, recording is allowed to begin immediately after the lapse of the period of 7H from a delayed PG pulse pg" which is delayed and adjusted to the same phase as the PG pulse pg of the conventional apparatus.

Therefore, the power supply is effected to the circuit of slow rise time earlier than the conventional apparatus. After that, recording start timing, i.e. the recording position on the disc, is the same as the format of the conventional apparatus. However, unlike the conventional apparatus, the embodiment obviates the necessity of waiting for one field period and permits recording to begin immediately after the lapse of the period of 7H from the first pulse of the PG pulse signal pg" as all the circuits concerned have been stabilized by then. The recording start timing of the embodiment is thus earlier than that of the conventional apparatus by one field period. The length of time and the electric energy consumption required for recording thus can be lessened by the arrangement of the embodiment.

After the start of recording, the ensuing processes may be carried out in the same manner as the conventional apparatus to ensure interchangeability with the conventional apparatus. However, it must be noted that the PG pulse signal is supplied directly to the system controller 10 without supplying it via the delay circuit 13 when it is first detected. Therefore, at that point of time, a power supply is effected to the signal circuit of the analog system having slow rise time.

Figure 6:
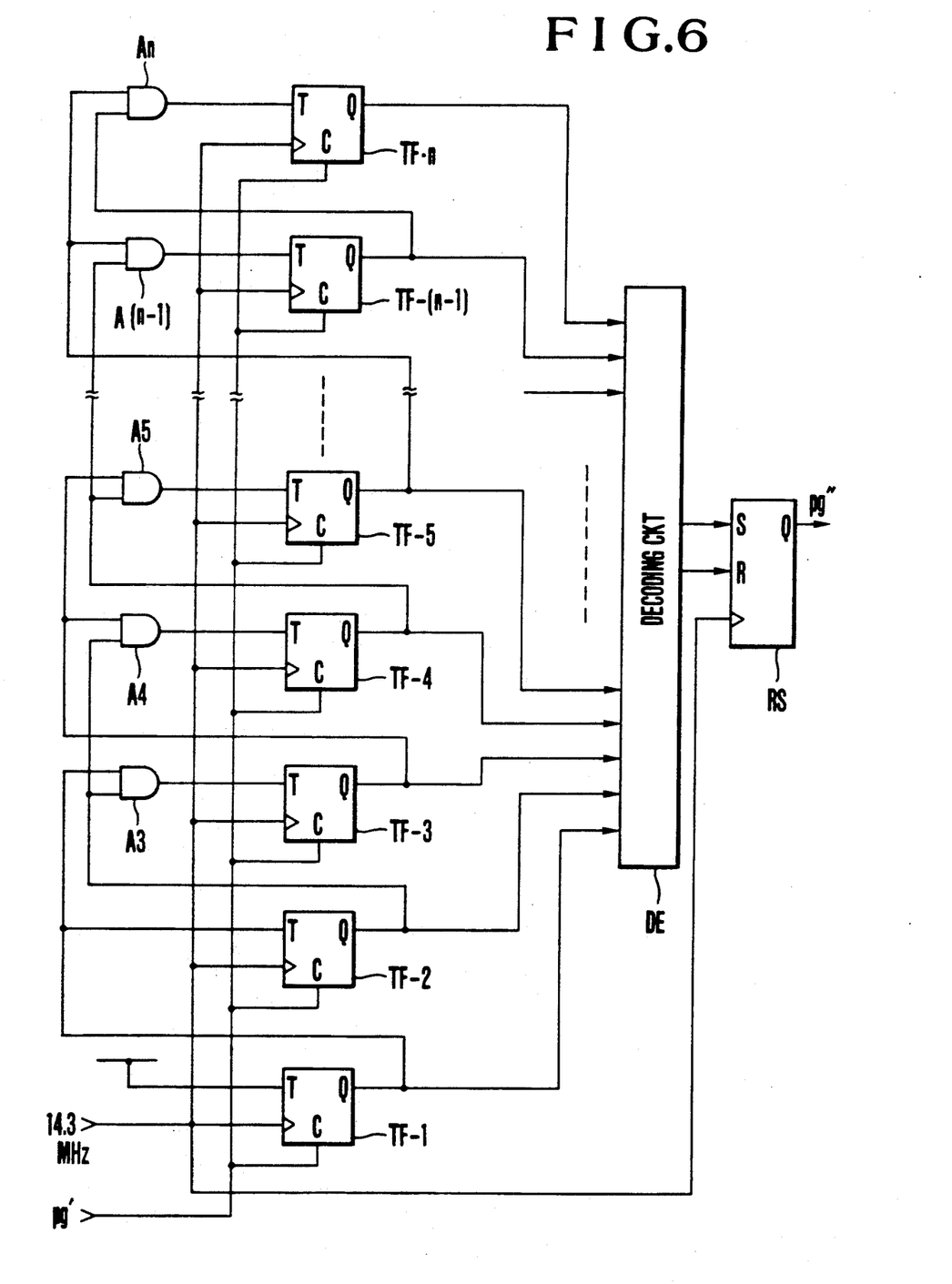
FIG. 6 is a block diagram showing by way of example a delay circuit operating with a high degree of precision.

The above stated delay circuit may be such an analog arrangement called a delay line which is popularly in use and is composed of L-C, C-R, etc. However, use of a digital delay circuit which is arranged as shown in FIG. 6 permits control with a higher degree of precision. Referring to FIG. 6, the digital delay circuit comprises a counter which includes a plurality of T flip-flops TF-1 to TF-n and a plurality of AND circuits A3 to An; a decoding circuit DE which is arranged to produce a given output signal according to the output of the counter; and an R-S flip-flop circuit RS which is arranged to be set and reset by the output of the decoding circuit DE. In the case of such a recording apparatus as a still video camera that uses a solid-state image sensor such as a CCD or the like, the delay circuit is arranged to be driven on the basis of a clock signal of a quartz crystal oscillator the frequency of which is determined according to the number of horizontal picture elements. Generally, a clock signal of ten odd M Hz is used. This clock signal is frequency divided by the counter consisting of the T flip-flops. The counter is reset by the PG pulse signal pg' detected at a timing which is earlier than the conventional apparatus by a degree corresponding to the rotation phase angle "a".

The R-S flip-flop RS is reset when the count of the counter reaches a given value after the receipt of the PG pulse signal pg'. Then the output of the R-S flip-flop RS becomes the signal pg", which is obtained by delaying the PG pulse signal pg'. In this instance, the pulse width of the PG pulse signal is adjustable as desired by changing the arrangement of the decoding circuit, i.e. its set value.

Figure 7:
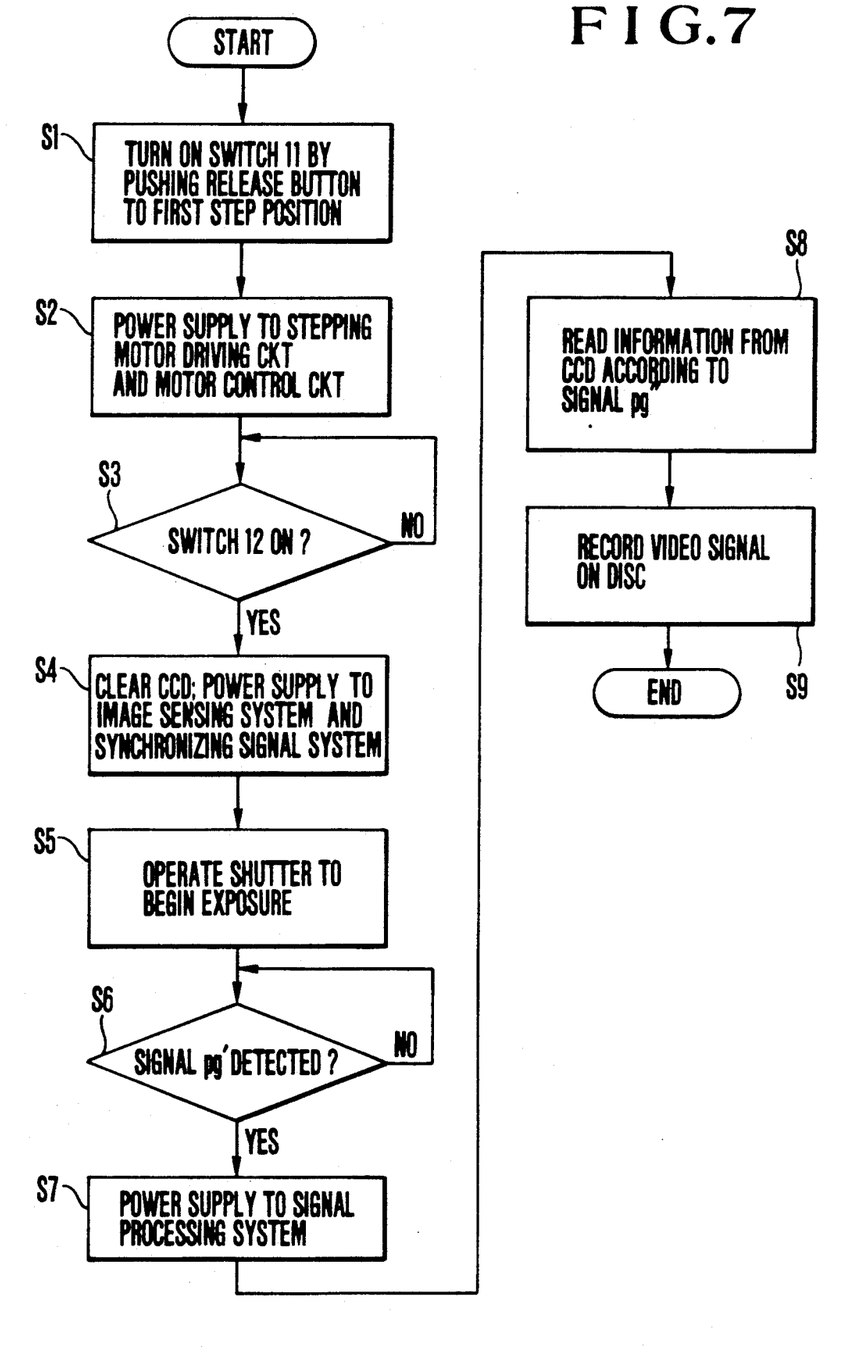
FIG. 7 is a flow chart showing a photo taking sequence of processes of the invented recording apparatus.

FIG. 7 shows in a flow chart the sequence of photo taking processes of this embodiment. At a step S1: A switch 11 is closed by pushing a release switch which is not shown to the first step position of its stroke. Step S2: The power supply from the battery E is effected to the system controller 10. The transistor Tr4 is turned on. The transistor Tr6 is turned on by this to permit a power supply to the stepping motor driving circuit 6 and the motor control circuit 8. The motor begins to steadily rotate at a normal speed. Step S3: When the release switch is further pushed to its second step position, the switch 12 is closed. Step S4: The system controller 10 turns the transistor Tr3 on to clear, before an exposure, the electric charge of the solid-state image sensor which is a CCD or the like. Then, a power supply is effected to the image sensing circuit 2 and the synchronizing signal generating circuit 9 via the transistor T5. Step S5: An exposure begins by operating the shutter. After that the flow of operation comes to a step S6. At the step S6: A check is made to see if the output signal pg' of the PG detector (or a PG coil) PG' is detected. Step S7: The transistor Tr8 is turned on according to the signal pg' which is detected either after the exposure or immediately after completion of the exposure. With the transistor Tr7 turned on, a power supply is effected to the signal processing system which has slow rise time. Step S8: Sensed image information is read out from the CCD according to the PG pulse signal pg" which is in-phase with the PG pulse signal pg and is obtained with the PG pulse signal pg' delayed by the delay circuit 13. Step S9: After the lapse of a period of 7H±2H from the rise of the PG pulse signal pg", a video signal is recorded on the disc D through the magnetic head 4.

As for the recording position on the magnetic disc, recording is performed in accordance with the same format as the conventional apparatus. Meanwhile, the power supply to the analog signal processing system circuit which is of slow rise time is effected at a timing earlier than the conventional apparatus. Therefore, the recording operation as a whole is carried out within a shorter period of time with less electric energy consumption by the embodiment than the conventional apparatus.

Figure 8:
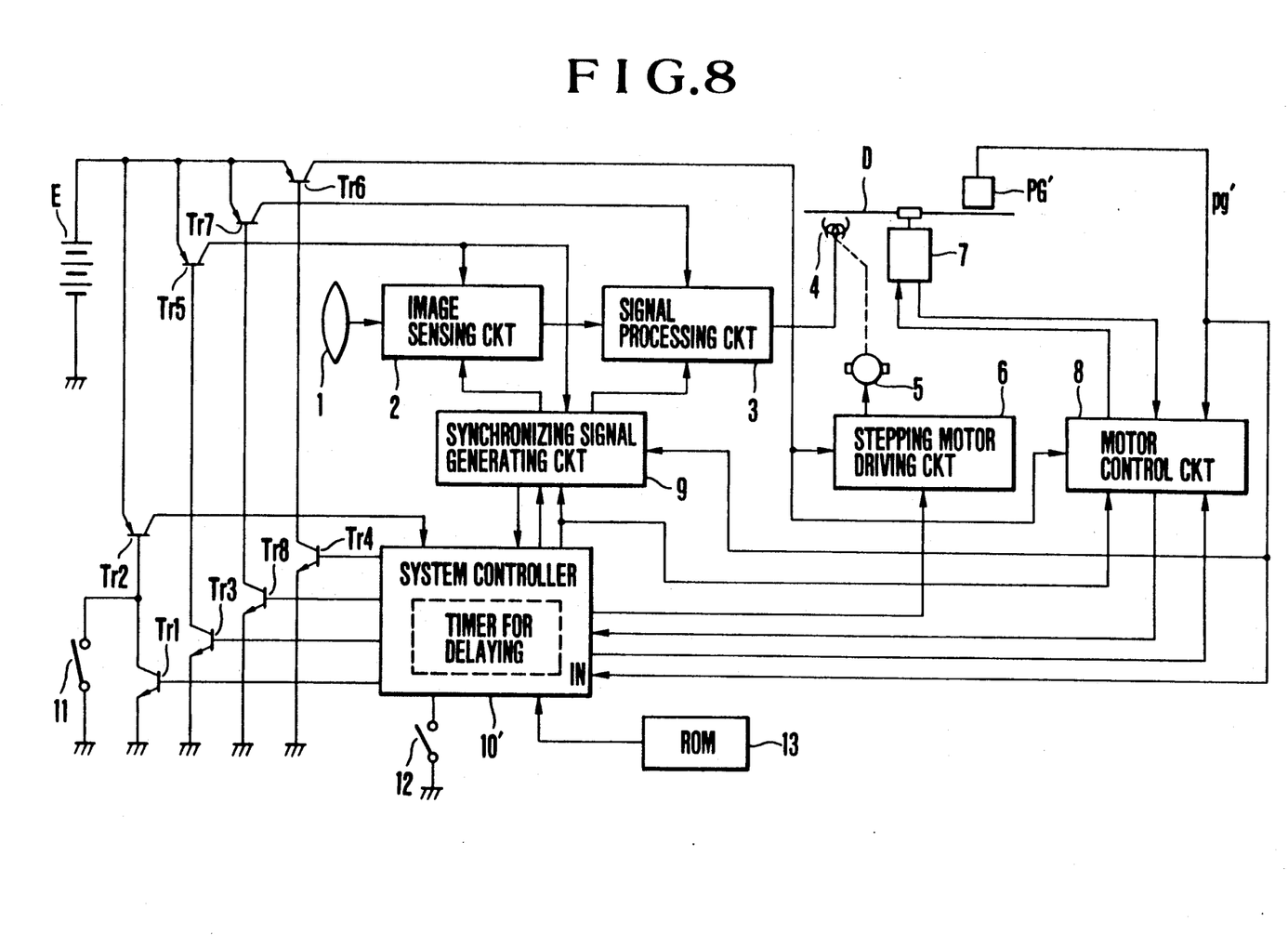
FIG. 8 is a block diagram showing a second embodiment of the invention.

FIG. 8 shows in a block diagram a second embodiment of the invention. The second embodiment dispenses with the use of the delay circuit 13 which is used in the first embodiment shown in FIG. 4. In place of the use of the delay circuit, a system controller 10' is arranged to generate a delay signal. More specifically, the second embodiment is arranged as follows: A CPU is employed as the system controller 10'. The PG pulse signal pg' of an advanced phase is arranged to be supplied to an interrupt terminal IN of the system controller 10' as an interruption input. Then, by using a timer formed by software, a signal which is delayed for a period of time corresponding to the advanced phase "a" of the PG pulse signal pg' is generated at an output port of the system controller 10'. In this case, there arises some error in the delaying degree according to the executing speed of the software. However, the error is only several μ sec and thus does not present any problem for an actual operation. Further, the second embodiment is provided with a ROM 13 which is arranged to store information on the delay time. The degree of delay can be changed as desired by rewriting the contents of the ROM 13.

As described in the foregoing, in the recording apparatus which is of the kind using a rotary recording medium having a PG pin (a marker member) in a given position for detection of the rotation phase thereof and is arranged according to this invention, the phase detecting means (PG coil) which is provided for detecting the PG pin from the rotating medium (disc) is located in a position differing from its position in the conventional apparatus in the direction of advancing the phase to be detected. In combination with this, a delay circuit is arranged to delay the output of the phase detecting means. The power supply to the electric circuits forming a recording system is controlled according to the timing of the output from the phase detecting means. A recording action is controlled by the timing of the output of the delay circuit. The invented arrangement enables the apparatus to detect the PG pin earlier than the conventional apparatus by a length of time required for the stabilization of the circuit of slow rise time, so that the power supply can be effected to the circuit at the earlier timing. Meanwhile, the timing for recording is set according to a signal which is obtained by delaying the PG detection pulse as much as a length of time by which the PG pin detection by the PG coil is quickened. Therefore, the information record thus obtained on the disc is completely in conformity to the format of an information record obtained by the conventional apparatus. Therefore, the embodiment ensures interchangeability with the conventional apparatus. Another advantage of the embodiment lies in that the degree of the delay can be always set at a minimum necessary value according to the circuit arrangement of the apparatus. Therefore, unlike the conventional apparatus, it is not necessary to postpone the start of recording until a PG pulse is obtained after one turn of the disc when recording is impossible at the timing of a first PG pin detection pulse. The embodiment thus effectively prevents the electric energy from being wasted by the power supply to each circuit while it is kept waiting for recording. Electric energy consumption thus can be minimized.

The second embodiment described above is arranged to permit easy adjustment of the delay time. In the event of any minor degree of error in the mounting position of the PG coil, the value of delaying degree set at the ROM is correctable according to the error. The embodiment thus obviates the necessity of mechanical adjustment to a high degree of precision.

What is claimed is:

1. A recording apparatus using a rotary recording medium provided with a marker member in a given position on said recording medium for detecting a rotation phase thereof, comprising:
 a) rotatory driving means for rotating said recording medium;
 b) detecting means for detecting said marker member on said recording medium while said recording medium is being rotated by said rotatory driving means;
 c) delay means for delaying an output of said detecting means for a given period of time;

d) recording means for performing recording on said recording medium; and e) control means for effecting a power supply to said recording means at a timing synchronized with the output of said detecting means and for causing said recording means to perform recording on said recording medium at a timing synchronized with an output of said delay means.

2. An apparatus according to claim 1, wherein said recording medium is a magnetic disc.

3. An apparatus according to claim 1, wherein said marker member is arranged to generate magnetic lines of force, and wherein said detecting means is arranged to magnetically detect said marker member.

4. An apparatus according to claim 1, wherein said recording means includes a magnetic head and head shifting means for shifting said magnetic head relative to said recording medium, and wherein said recording means is arranged to perform magnetic recording on said recording medium by means of said magnetic head.

5. An apparatus according to claim 1, wherein said delay means is arranged to delay an output of said detecting means for a period of time required before said recording means comes into a stable state after said power supply is effected to said recording means.

6. An apparatus according to claim 5, wherein said marker member and a recording start position on said recording medium are arranged to be always in a specific positional relation to each other, and wherein said control means is arranged to control said recording means in such a manner as to maintain said specific positional relation.

7. An apparatus according to claim 6, wherein a rotation phase difference between the position of said marker member and said recording start position is smaller than the displacement of a rotation phase of said recording medium corresponding to a delay time of said delay means.

8. An apparatus according to claim 4, further comprising:
a) image sensing means for converting an optical image formed on an image sensing plane into an electrical signal to supply said electrical signal to said recording means; and
b) a release switch arranged to be pushed in two steps of stroke.

9. An apparatus according to claim 8, wherein said control means is arranged to effect a power supply to said rotatory driving means and said head shifting means in response to a first step of pushing stroke of said release switch and to have an image taken in by said image sensing means in response to a second step of pushing stroke of said release switch.

10. An apparatus according to claim 9, wherein said control means is arranged to effect a power supply to said recording means when said detecting means detects said marker member for the first time after an image is taken in said image sensing means and to allow said recording means to begin recording in response to the output of said delay means.

11. An apparatus according to claim 1, wherein said delay means is composed of a digital counter.

12. An apparatus according to claim 1, wherein said delay means is composed of a program formed by a microcomputer which is included in said control means.

13. A recording apparatus arranged to use a rotary recording medium provided with a marker member in a given position on said recording medium for detecting the rotation phase thereof and to begin recording on said recording medium at a recording start position determined relative to the position of said marker member when a given period of time lapses from the position of said marker member, comprising:

a) rotatory driving means for rotating said recording medium;

b) detecting means for detecting said marker member on said recording medium while said recording medium is being rotated by said rotatory driving means;

c) recording means for performing recording on said recording medium; and d) timing signal generating means for generating, on the basis of the output of said detecting means, a first timing signal for causing a power supply to begin to said recording means and a second timing signal for causing said recording means to begin recording, said first timing signal being arranged to be generated earlier than said second timing signal by a period of time which is longer than said given period of time.

14. An apparatus according to claim 13, wherein said recording medium is a magnetic disc.

15. An apparatus according to claim 13, wherein said marker member is arranged to generate magnetic lines of force, and wherein said detecting means is arranged to magnetically detect said marker member.

16. An apparatus according to claim 13, wherein said recording means includes a magnetic head and head shifting means for shifting said magnetic head relative to said recording medium, and wherein said recording means is arranged to perform magnetic recording on said recording medium by means of said magnetic head.

17. An apparatus according to claim 13, wherein said timing signal generating means is arranged to produce a pulse signal output of said detecting means as said first timing signal and to produce said second timing signal by delaying said first timing signal for a given period of time.

18. An apparatus according to claim 17, wherein between said first and second timing signals there is a phase difference corresponding to a period of time which is required for allowing said recording means comes into a sufficiently stable state after the power supply is effected to said recording means.

19. An apparatus according to claim 16, further comprising:
a) image sensing means for converting an optical image formed on an image sensing plane into an electrical signal to supply said electrical signal to said recording means; and
b) a release switch arranged to be pushed in two steps of stroke.

20. An apparatus according to claim 19, wherein said control means is arranged to effect a power supply to said rotatory driving means and said head shifting means in response to a first step of pushing stroke of said release switch and to have an image taken in by said image sensing means in response to a second step of pushing stroke of said release switch.

21. An image sensing apparatus arranged to record picked-up image information on a disc-shaped rotary recording medium provided with a marker member on said recording medium for detecting a rotating state of said recording medium, and to begin recording from a recording start position which is set at a point delayed as much as a given rotation phase from the position of said marker member on said recording medium, said apparatus comprising:

a) image sensing means for converting an optical image formed on an image sensing plane thereof into an electrical signal;

b) recording means for causing an image signal produced from said image sensing means to be recorded on said recording medium;

c) rotatory driving means for rotating said recording medium;

d) detecting means for detecting said marker member on said recording medium while said recording medium is being rotated by said rotatory driving means; and e) control means for causing, according to an output of said detecting means, said recording means to begin to record said image signal from said recording start position on said recording medium while said recording medium is being rotated and for bringing said recording means into an operation preparing state at a point of time preceding the position of said marker member by a given rotation phase.

22. An apparatus according to claim 21, wherein said marker member is arranged to generate magnetic lines of force, and wherein said detecting means is arranged to magnetically detect said marker member.

23. An apparatus according to claim 21, wherein said recording means includes a magnetic head and head shifting means for shifting said magnetic head relative to said recording medium, and wherein said recording means is arranged to perform magnetic recording on said recording medium by means of said magnetic head.

24. An apparatus according to claim 21, wherein said operation preparing state of said recording means is brought about by a power supply effected to said recording means.

25. An apparatus according to claim 24, wherein said control means is arranged to have said power supply effected to said recording means preceding the rotation phase of said recording start position as much as a rotation phase corresponding to a period of time required before said recording means comes into a sufficiently stable state after said power supply is effected to said recording means.

26. A recording apparatus, comprising:

(A) driving means for driving a recording medium to rotate the same in a predetermined period;

(B) detecting means for detecting a driving state of said recording medium by detecting indication means formed on said recording medium;

(C) delay means for applying a predetermined time delay to an output of said detecting means:

(D) recording means, comprising a first electric circuit and a second electric circuit having a slower rising time than that of said first electric circuit, for recording an information on said recording medium; and (E) control means for causing operation of said second electric circuit in response to an output of said detecting means and for causing operation of said first electric circuit in response to an output of said delay means.

27. A recording apparatus according to claim 26, wherein said recording medium is a magnetic disc, which is rotated by said driving means, and said predetermined period is a period of a vertical synchronizing signal for an image signal.

28. A recording apparatus according to claim 26, wherein said delay means provides a delay time which is shorter than a time from detection of the indication means on the recording medium to the start of recording and wherein said delay time is adjustable.

29. A recording apparatus according to claim 26, wherein said recording means consists of means for converting an image information signal to a record signal suitable for recording on said recording medium and means for recording said record signal on said recording medium.

30. A recording apparatus according to claim 29, wherein said recording means further includes:

a head for recording a record signal on a recording medium;

head shifting means for shifting said head to a recording position on the recording medium; and a recording switch having at least two stages of operating position, arranged such that said control means feeds power to said driving means and said head shifting means by operating said recording switch to its first stage and then effects recording on said recording medium, on the basis of outputs of said detecting means and said delay means, after said recording switch has been operated to its second stage.

31. An image recording apparatus, comprising:

(A) rotation driving means for rotating a disc-shaped recording medium at a rotating speed synchronized with a field period;

(B) detecting means for detecting rotational phase indicating means positioned on said recording medium, to output a signal corresponding to a phase of rotation of said recording medium;

(C) pulse generated means for generating a first pulse signal and a second pulse signal having a predetermined delay relative to said first pulse signal, on the basis of an output of said detecting means;

(D) recording means, comprising a first electric circuit and a second electric circuit having a rising time slower than that of said first electric circuit, for recording an image information signal on said recording medium; and (E) control means for controlling said second electric circuit of said recording means in response to said first pulse signal of said pulse generating means and for controlling said first electric circuit of said recording means in response to said second pulse signal, to record said image information signal on said recording medium at a time when a predetermined time has elapsed after generation of said first pulse signal.

32. An image recording apparatus according to claim 31, wherein said detecting means is located at an advanced phase position relative to a position of the rotational phase indicating means on the recording medium, as viewed from a record starting position of said recording medium.

33. An image recording apparatus according to claim 32, wherein a difference in phase between said first and second pulse signals is substantially larger than a difference in phase corresponding to a difference in rising time between said first electric circuit and said second electric circuit and smaller than a difference in phase between the output timing of said first pulse signal and the record starting position.

34. An image recording apparatus according to claim 31, wherein said recording means includes image sensing means for sensing an image and converting said image into an image signal, and signal processing means for converting an image signal output of said image sensing means into a signal suitable for recording on said recording medium.

35. An image recording apparatus according to claim 34, wherein said second electric circuit includes an analog circuit.

36. A still video camera for recording a still image on a disc-shaped recording medium, comprising:
(A) image sensing means for sensing an image of an object formed on an image sensing plane, and for converting said image into an electric signal, thereby outputting an image sensing signal;
(B) recording means for applying a predetermined signal processing to said image sensing signal to convert said signal into a record signal which is suitable for recording on said recording medium and for recording said record signal onto said recording medium;
(C) rotation driving means for rotating said disc-shaped recording medium at a predetermined period synchronized with a field period;
(D) detecting means for detecting rotational phase indicating means on said recording medium, thereby outputting a signal corresponding to a phase of rotation of said recording medium;
(E) pulse generating means for generating a first pulse signal and a second pulse signal which is delayed for a predetermined time from said first pulse signal, on the basis of an output of said detecting means; and
(F) control means for controlling said recording means to cause a part of said recording means to be in an operating state, in response to said first pulse signal of said pulse generating means, and to effect recording of said record signal onto said recording medium, in response to said second pulse signal.

37. A still video camera according to claim 36, wherein said recording medium is set so that a position where the rotational phase indicating means is formed and a record starting position are in a specific phase relation to each other, and said detecting means is located at a predetermined phase advanced position, in a rotating direction of said recording medium, relative to the position of the rotational phase indicating means on the recording medium, as viewed from the record starting position of said recording medium.

38. A still video camera according to claim 37, wherein said pulse generating means is arranged to generate a first pulse signal in response to detection of said rotational phase detecting means by said detecting means and to generate the second pulse signal, with a time delay corresponding to the phase difference between the position where said detecting means is located and the position of said rotational phase indicating means.

39. A still video camera according to claim 36, wherein the recording means further includes:
a head for recording a record signal on a recording medium;
head shifting means for shifting said head to a recording position on the recording medium; and
a recording switch having at least two stages of operating position, in which said control means is arranged to feed power to said rotation driving means and said head shifting means by operating said recording switch to its first stage and to effect recording on said recording medium, on the basis of said first pulse signal and second pulse signal, after said recording switch has been operated to its second stage.

40. A still video camera according to claim 36, wherein the phase difference between said first pulse signal and said second pulse signal is adjustable.

41. A recording apparatus for recording a record information on a recording medium having an indicating member thereon for detection of a rotating phase of said medium, said indicating member being located at a position having a specific phase relation to a record starting position, in which a phase of the record starting position relative to said recording medium is decided by detecting said indicating member, comprising:
(A) rotation driving means for rotating said recording medium;
(B) recording means for recording the record information on the recording medium which is rotated by said rotation driving means;
(C) detecting means for detecting said indicating member of said recording medium rotated by said rotation driving means, thereby outputting a pulse signal, said detecting means being set at a position where the phases at the position of detecting said indicating member and at the record starting position have a phase relation different from the above-mentioned specific phase relation;
(D) phase control means for controlling the phase relation between the output pulse signal of said detecting means and said record starting position so that said phase relation becomes the above-mentioned specific phase relation; and
(E) control means for controlling said recording means to cause a part of said recording means to enter into its operative state, in response to the output pulse signal of said detecting means and to effect recording of the record information on said recording medium, in response to an output of said phase control means.

42. A recording apparatus according to claim 41, wherein said recording medium is a magnetic disc, and wherein said rotation driving means rotates said recording medium at a constant speed at a predetermined period.

43. A recording apparatus according to claim 41, wherein said control means is arranged to feed power to a circuit having a slower rising speed than that of said recording means in response to the output pulse signal of said detecting means and to start recording onto said recording medium in response to the output pulse of said phase control means.

44. A recording apparatus according to claim 42, wherein said recording means includes:
an image sensing element for sensing an image and converting said image into an image signal;
a signal processing circuit for applying a predetermined signal processing to the image signal outputted from said image sensing element to convert the image signal to a record signal suitable for storing in said recording medium;
a head for recording said record signal on said recording medium;
head shifting means for shifting said head to a desired position on the recording medium; and
a recording switch having at least two stages, arranged such that said control means feeds power to said rotation driving means and said head shifting means by operating said recording switch to its first stage and then effects recording onto said recording medium, on the basis of the output pulse signal of said detecting means and the output signal of said phase control means, after said recording switch has been operated to its second stage.

* * * * *